United States Patent
Kim

(10) Patent No.: US 11,383,580 B2
(45) Date of Patent: Jul. 12, 2022

(54) APPARATUS AND METHOD FOR CONTROLLING VEHICLE

(71) Applicant: LG ELECTRONICS INC., Seoul (KR)

(72) Inventor: Hyun Kyu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 497 days.

(21) Appl. No.: 16/557,530

(22) Filed: Aug. 30, 2019

(65) Prior Publication Data

US 2019/0381855 A1 Dec. 19, 2019

(30) Foreign Application Priority Data

Aug. 8, 2019 (KR) .................. 10-2019-0096726

(51) Int. Cl.
| | |
|---|---|
| *B60H 1/00* | (2006.01) |
| *B60W 10/30* | (2006.01) |
| *G01C 21/26* | (2006.01) |
| *B60W 50/00* | (2006.01) |

(52) U.S. Cl.
CPC ............ *B60H 1/008* (2013.01); *B60W 10/30* (2013.01); *B60W 50/0098* (2013.01); *G01C 21/26* (2013.01); *B60W 2552/00* (2020.02); *B60W 2555/20* (2020.02)

(58) Field of Classification Search
CPC ... B60H 1/008; B60W 10/30; B60W 50/0098; G01C 21/26
See application file for complete search history.

(56) References Cited

U.S. PATENT DOCUMENTS

| | | | | |
|---|---|---|---|---|
| 10,226,982 B2* | 3/2019 | Alger | ................... | B60H 1/008 |
| 10,955,250 B2* | 3/2021 | Leone | ................. | G07C 5/0816 |
| 2007/0243808 A1* | 10/2007 | Mathur | ............... | B60H 3/0085 |
| | | | | 454/75 |
| 2012/0293315 A1* | 11/2012 | Schunder | ......... | G08G 1/096775 |
| | | | | 701/1 |
| 2019/0084369 A1* | 3/2019 | Duan | ................... | B60H 1/008 |

FOREIGN PATENT DOCUMENTS

KR     20150058881 A     5/2015

* cited by examiner

*Primary Examiner* — Khoi H Tran
*Assistant Examiner* — Rodney P King
(74) *Attorney, Agent, or Firm* — Fish & Richardson P.C.

(57) ABSTRACT

An apparatus and a method for controlling a vehicle, which control a route of the vehicle or an air circulation mode of the vehicle based on an outdoor air condition of an autonomous driving vehicle and control an indoor air cleaner of the vehicle based on an indoor air condition. In some implementations, an apparatus for controlling a vehicle includes an outdoor measurement sensor attached to an exterior of the vehicle and measuring an external fine dust concentration, a communicator receiving, from an environment server, a local fine dust concentration corresponding to a position of the vehicle, and when a difference between the measured external fine dust concentration and the received local fine dust concentration exceeds a set allowance, a controller checking whether an object generating fine dust exists outside the vehicle and allowing the vehicle to travel while avoiding the object when it is confirmed that the object exists.

20 Claims, 9 Drawing Sheets

[FIG. 1]
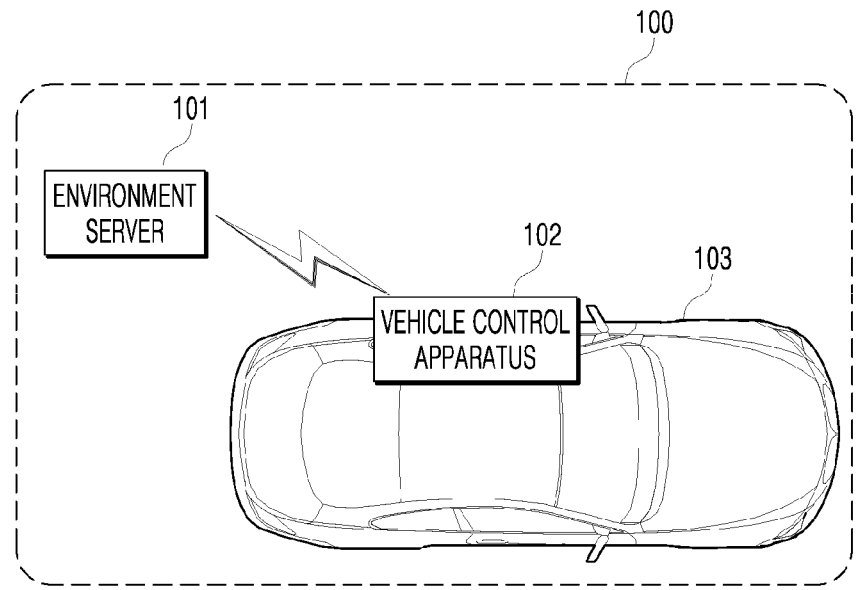
[FIG. 2]
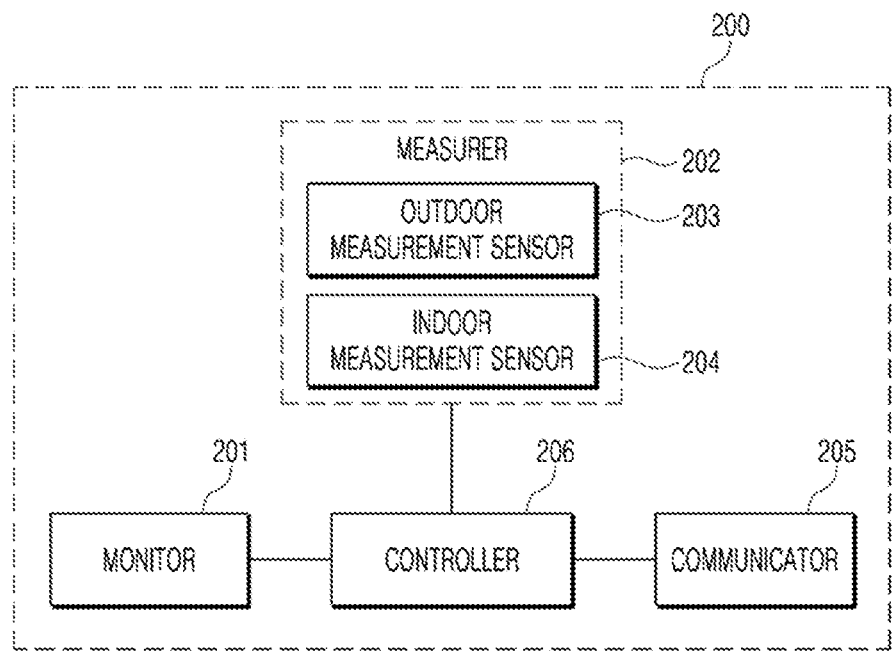

[FIG. 3]
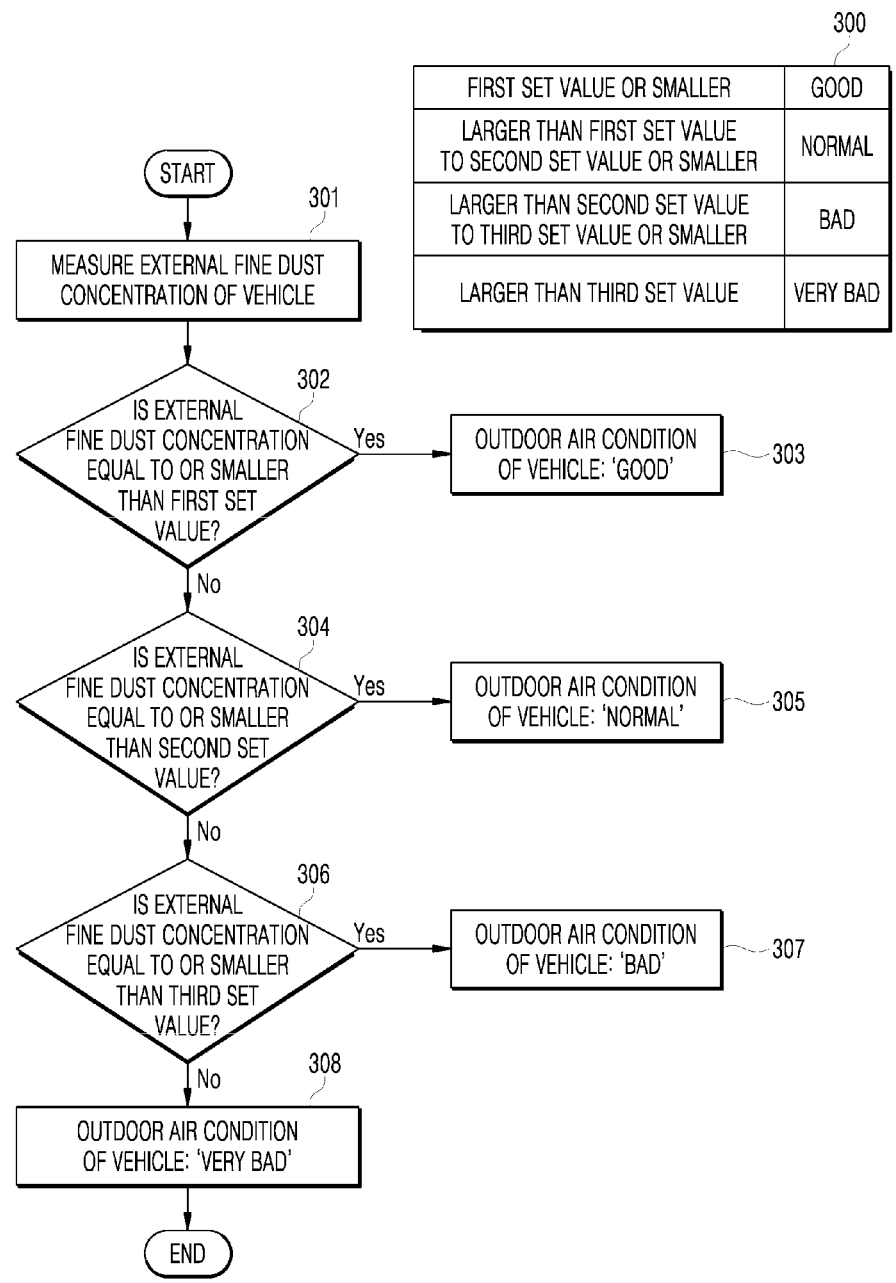

[FIG. 4]
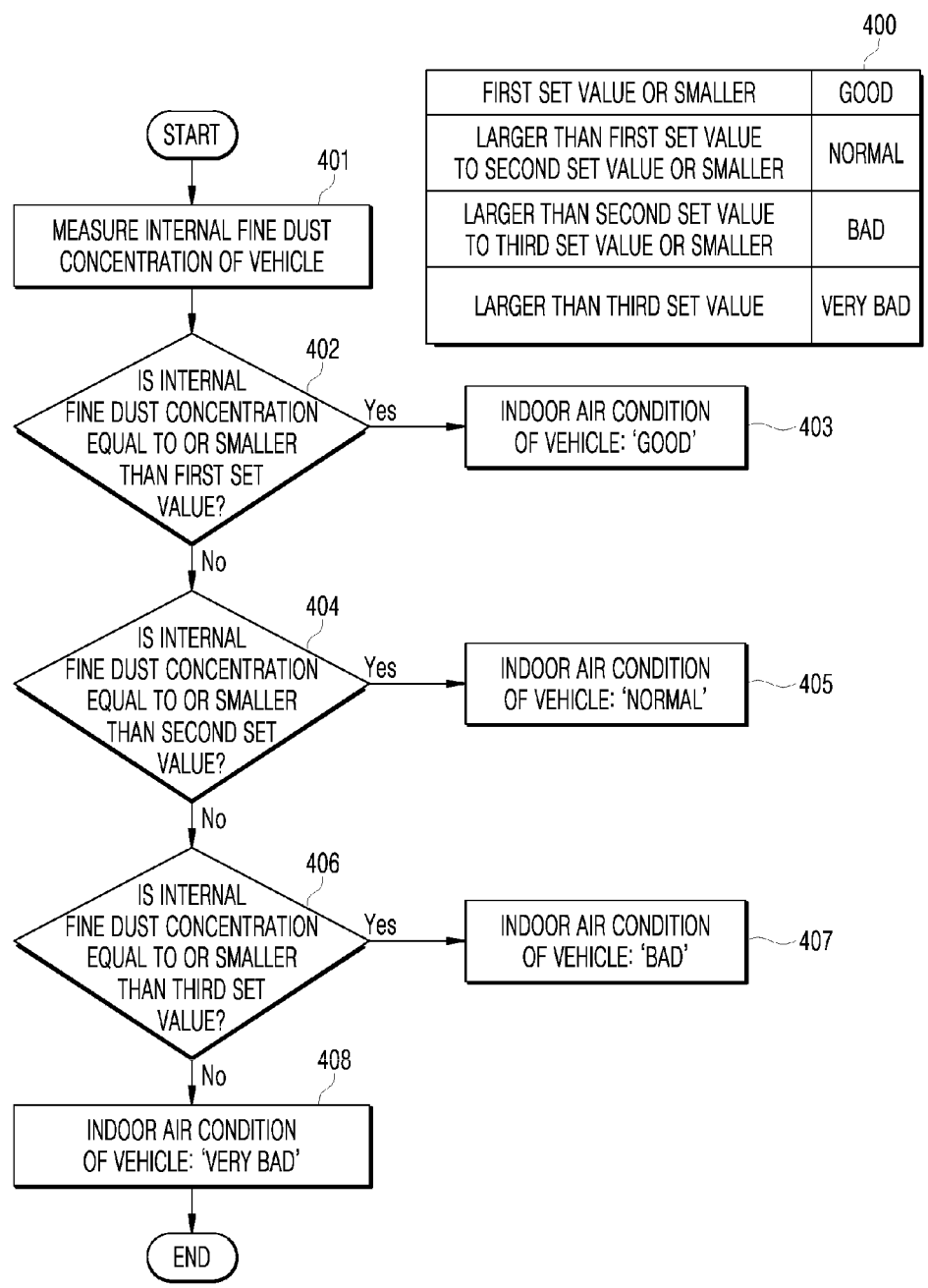

[FIG. 5]
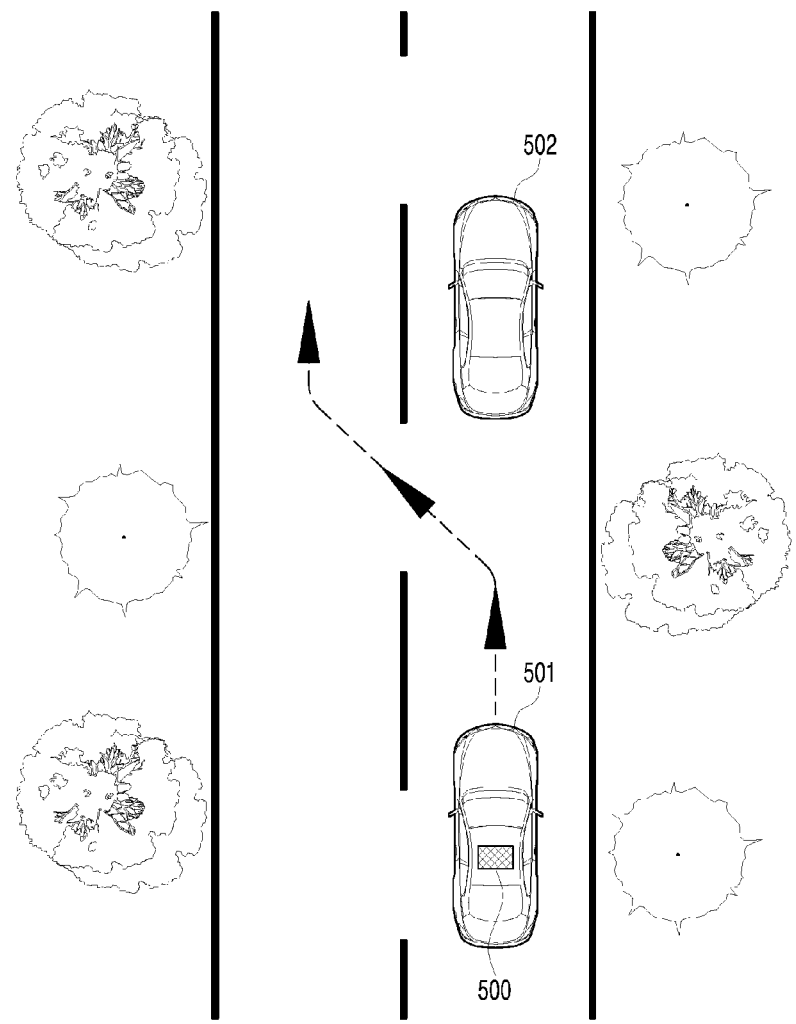

[FIG. 6]
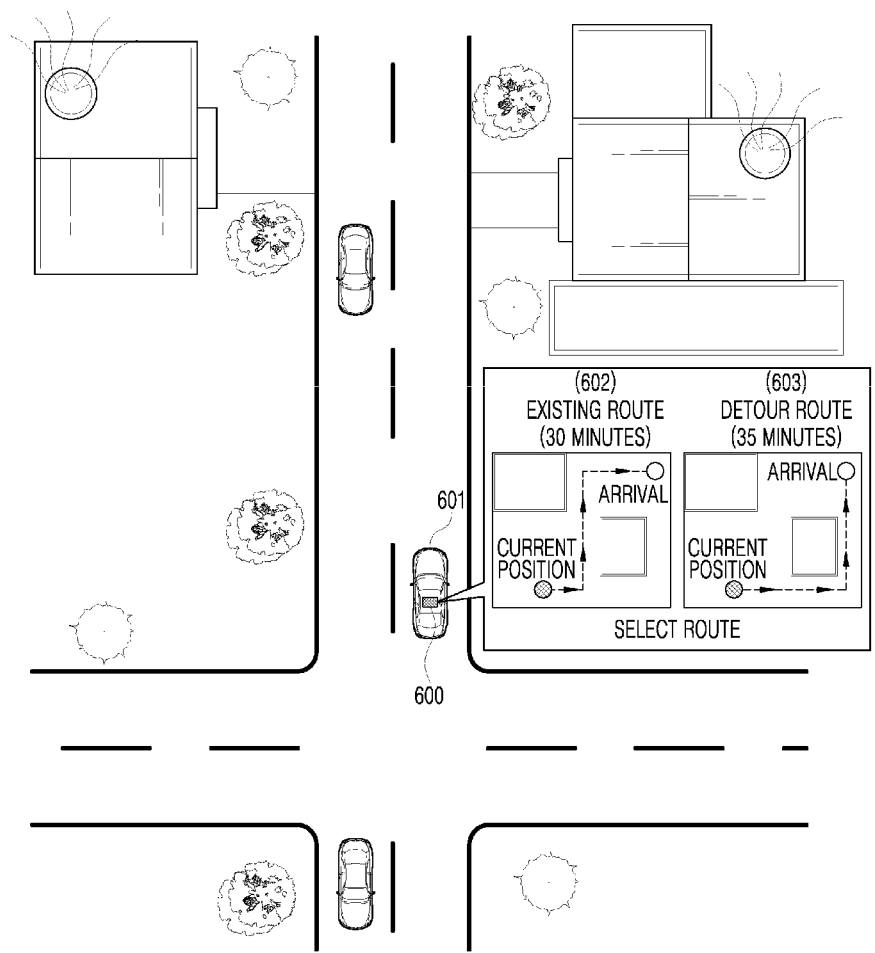

[FIG. 7]
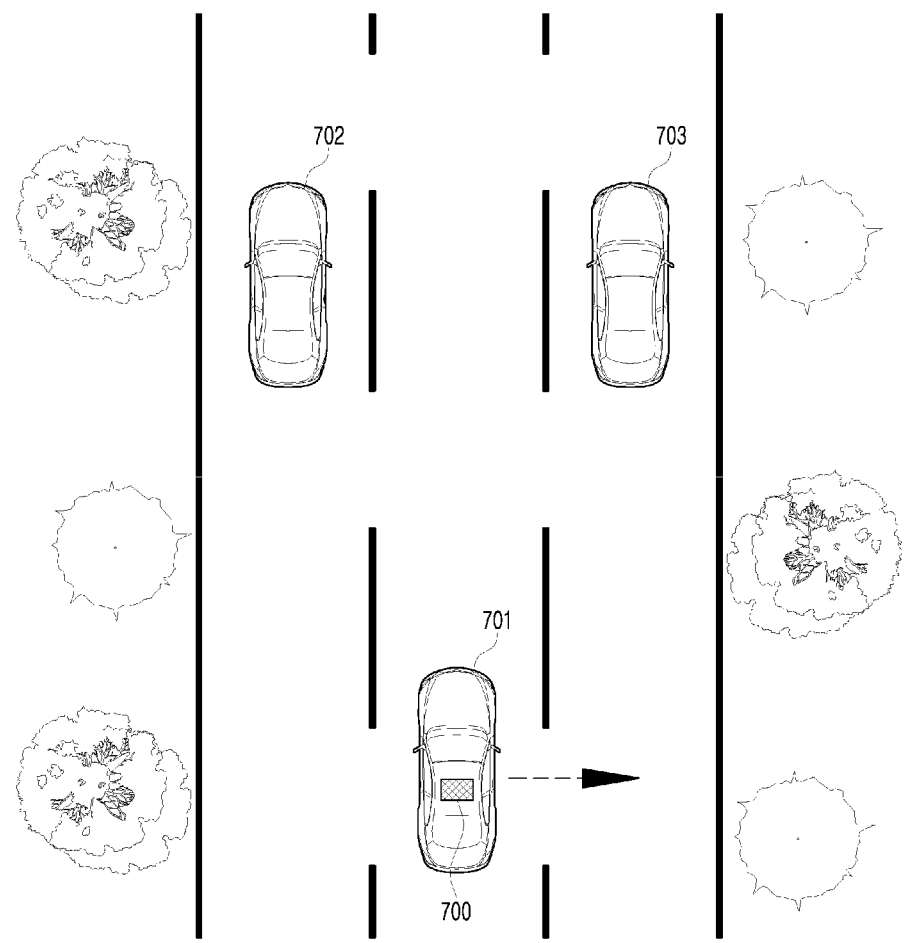

[FIG. 8]
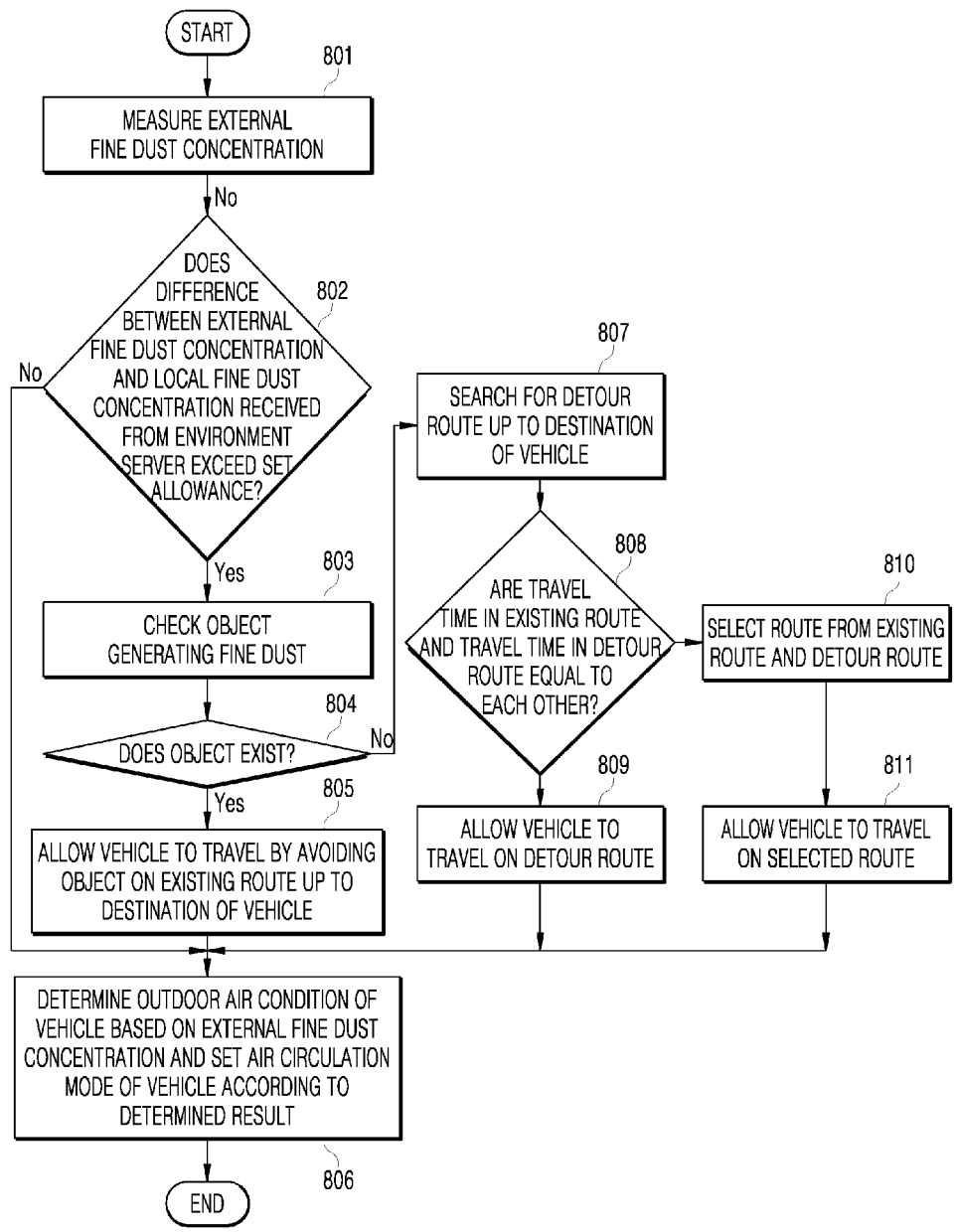

[FIG. 9]
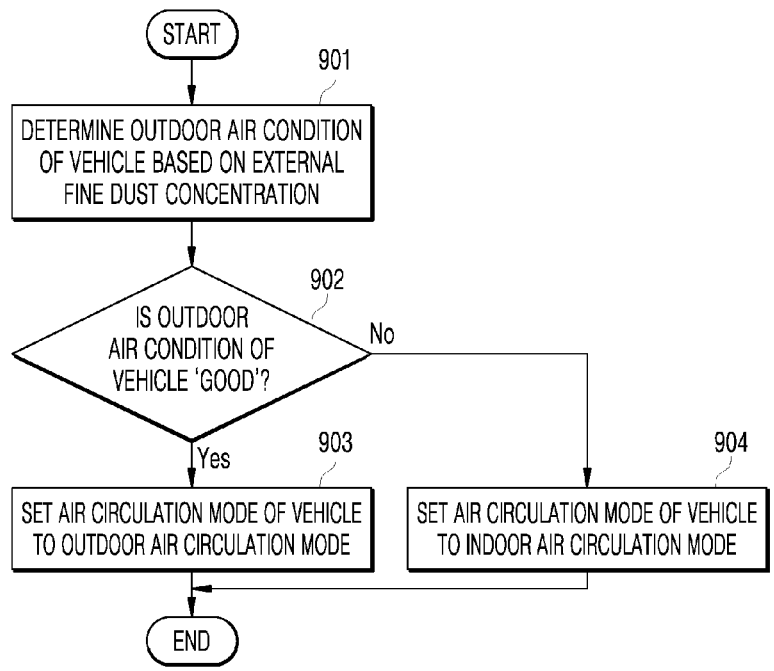

[FIG. 10]
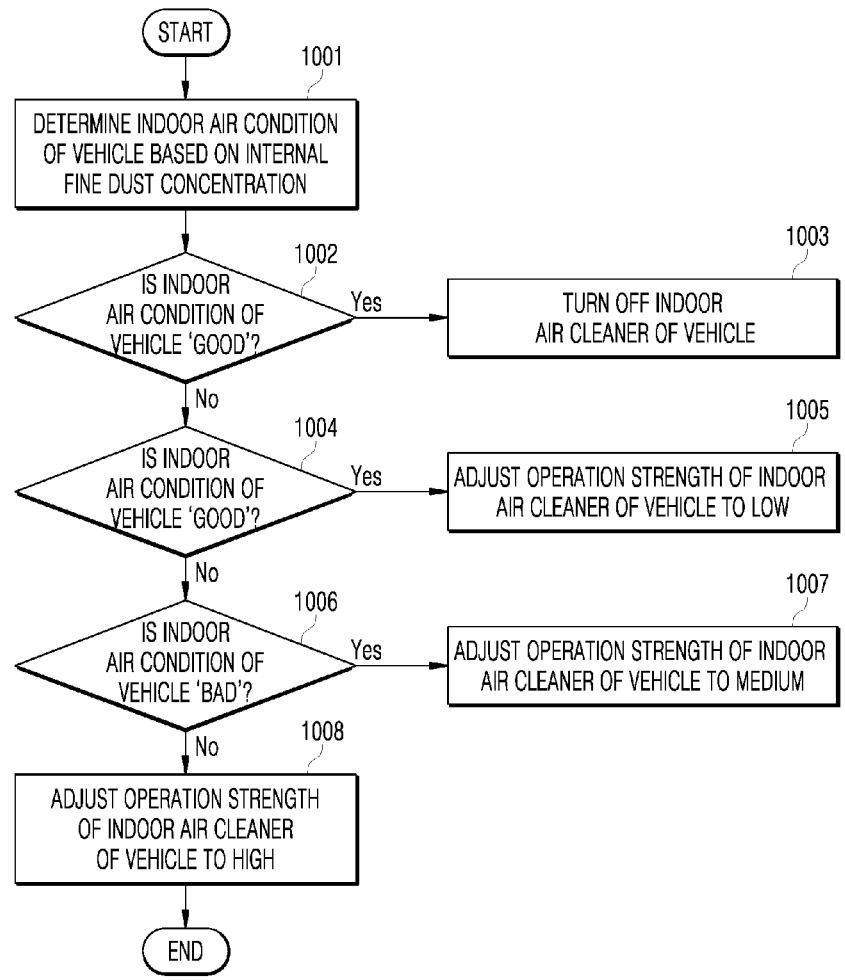

APPARATUS AND METHOD FOR CONTROLLING VEHICLE

CROSS-REFERENCE TO RELATED APPLICATION

This present application claims benefit of priority to Korean Patent Application No. 10-2019-0096726, entitled "APPARATUS AND METHOD FOR CONTROLLING VEHICLE" filed on Aug. 8, 2019, in the Korean Intellectual Property Office, the entire disclosure of which is incorporated herein by reference.

BACKGROUND

1. Technical Field

The present disclosure relates to an apparatus and a method for controlling a vehicle, which control, when there is an object contaminating air outside a vehicle, the vehicle by avoiding the object to travel and set an air circulation mode according to an external air condition of the vehicle to comfortably manage indoor air of the vehicle.

2. Description of Related Art

An air circulation mode which exists in a vehicle largely includes an outdoor air circulation mode and an indoor air circulation mode. The former case is a mode in which outdoor air flows into the vehicle to circulate air and the latter case is a mode in which air is circulated only in the vehicle without inflow of the outdoor air. A driver appropriately selects an outdoor air circulation mode and an indoor air circulation mode according to a situation to circulate the air of the vehicle.

However, in a vehicle generally equipped with the air circulation mode, in a situation in which the vehicle is driven in the outdoor air circulation mode and the vehicle is stopped by a traffic signal or the like, exhaust gas emitted from the vehicle in front of the vehicle flows into an interior of the vehicle, thereby giving an unpleasant feeling to the driver or increasing an indoor air contamination level of the vehicle. Accordingly, in this case, the driver should switch the air circulation mode to the indoor air circulation mode. However, when the vehicle is driven for a long time in the indoor air circulation mode, the air contamination level in the interior of the vehicle is increased again by carbon dioxide emitted from vehicle occupants. Accordingly, in this case, the driver should switch the air circulation mode to the outdoor air circulation mode. That is, the driver should continuously switch the air circulation mode while driving, depending on the situation of the vehicle, which is cumbersome for the driver. In addition, since it is common for the driver to switch the air circulation mode when there is an abnormality in the air inside the vehicle, the air circulation mode is switched only after the indoor air contamination level of the vehicle is increased. Therefore, it causes a problem that is not good for health of the vehicle occupants.

As one of the air circulation methods of the vehicle for solving such a problem, the prior art proposes a method for automatically switching the air circulation mode according to a distance from a front vehicle by designating the air circulation mode of the vehicle as the outdoor air circulation mode when the distance from the front vehicle is equal to or larger than a set value and by designating the air circulation mode of the vehicle as the indoor air circulation mode when the distance from the front vehicle is smaller than the set value.

However, in the air circulation method of the vehicle disclosed in the prior art, the air circulation mode is just switched according to the distance from the front vehicle, and when the distance from the front vehicle is equal to or larger than the set value even if an outdoor air condition of the vehicle is not good, the air circulation mode operates as the outdoor air circulation mode as the outdoor air condition of the vehicle is not considered, thereby still increasing the indoor air contamination level of the vehicle.

Accordingly, a technique is required, which can more comfortably manage the indoor air of the vehicle by controlling the air circulation of the vehicle after considering the outdoor air condition of the vehicle.

(Related Art) Korean Patent Application Publication No. 10-2015-0058881

SUMMARY OF THE INVENTION

An aspect of the present disclosure is to prevent, when there is an object to contaminate air outside a vehicle at a set short distance, the vehicle from being exposed to air contaminated by the object by controlling the vehicle to travel while avoiding the object.

Another aspect of the present disclosure is to allow the vehicle to deviate from an air contaminated area by allowing the vehicle to travel on a detour route to a destination of the vehicle, when there is no object to contaminate air outside the vehicle at the set short distance, but an external air quality of the vehicle deteriorates continuously for a set time.

Yet another aspect of the present disclosure is to make internal air of the vehicle comfortable by operating an air circulation device of the vehicle in an outdoor air circulation mode only when the external air quality of the vehicle is excellent by determining an outdoor air condition of the vehicle based on an external fine dust concentration of the vehicle and setting an air circulation mode of the vehicle according to the determined result.

Further, still yet another aspect of the present disclosure is to cleanly manage internal air of the vehicle by adjusting an operation strength of an indoor air cleaner in the vehicle differently depending on the indoor air condition of the vehicle.

According to an exemplary embodiment of the present disclosure, an apparatus for controlling a vehicle based on an air condition may include an outdoor measurement sensor attached to an exterior of the vehicle and measuring an external fine dust concentration, a communicator receiving, from an environment server, a local fine dust concentration corresponding to a position of the vehicle, and when a difference between the measured external fine dust concentration and the received local fine dust concentration exceeds a set allowance, a controller checking whether an object generating fine dust exists outside the vehicle and allowing the vehicle to travel by avoiding the object when it is confirmed that the object exists.

According to an exemplary embodiment of the present disclosure, the apparatus may further include a monitor monitoring an external environment of the vehicle, in which the controller confirms that the object generating the fine dust exists when an object positioned at a set short distance is detected from the monitoring result, and allows the vehicle to travel by avoiding the object when an external fine dust concentration periodically measured by the outdoor measurement sensor continuously increases for a set time.

According to an exemplary embodiment of the present disclosure, when a plurality of objects is detected from the monitoring result, the controller may make distances from the plurality of objects different from each other by moving the vehicle to left or right side, and at a moment when the external fine dust concentration measured by the outdoor measurement sensor decreases, the controller may identify an object positioned relatively far from the vehicle as the object generating the fine dust.

According to an exemplary embodiment of the present disclosure, when it is confirmed that the object generating the fine dust does not exist, but the external fine dust concentration periodically measured by the outdoor measurement sensor continuously increases for a set time, the controller may search for a detour route up to a destination of the vehicle and allow the vehicle to travel on the detour route instead of an existing route when the difference in each travel time to the destination of the vehicle between the existing route and the detour route is within a predetermined range.

According to an exemplary embodiment of the present disclosure, when the difference in each travel time between the existing route and the detour route is out of a predetermined range, the controller may provide the travel time in each of the existing route and the detour route through an outputter and allow the vehicle to travel on a route selected from among the existing route and the detour route.

According to an exemplary embodiment of the present disclosure, the controller may count the number of avoidances for the object generating fine dust, and when the counted number of avoidances is equal to or greater than a set number of times, the controller may search for the detour route to the destination of the vehicle, and when the difference in each travel time between the existing route and the detour route to the destination of the vehicle is within a predetermined range, the controller may allow the vehicle to travel on the detour route instead of the existing route.

According to an exemplary embodiment of the present disclosure, the controller may determine an outdoor air condition of the vehicle based on the measured external fine dust concentration and set an air circulation mode of the vehicle according to the determined result.

According to an exemplary embodiment of the present disclosure, when the outdoor air condition of the vehicle is determined to be 'good' based on a pre-set step-by-step criterion according to the determined result, the controller may set the air circulation mode to an outdoor air circulation mode, and when it is determined that the outdoor air condition of the vehicle is determined to 'normal', 'bad', or 'very bad' based on the pre-set step-by-step criterion according to the determined result, the controller may set the air circulation mode to an indoor air circulation mode.

According to an exemplary embodiment of the present disclosure, the apparatus may further include an indoor measurement sensor attached to an interior of the vehicle and measuring an internal fine dust concentration, in which the controller determines an indoor air condition of the vehicle based on the measured internal fine dust concentration and sets an operation strength of an indoor air cleaner in the vehicle differently depending on the determined result.

According to an exemplary embodiment of the present disclosure, the controller, according to the determined result, may turn off the indoor air cleaner when the indoor air condition of the vehicle is determined to be 'good', adjust the operation strength of the indoor air cleaner to 'low' when the indoor air condition of the vehicle is determined to be 'normal', adjust the operation strength of the indoor air cleaner to 'medium' when the indoor air condition of the vehicle is determined to be 'bad', and adjust the operation strength of the indoor air cleaner to 'high' when the indoor air condition of the vehicle is determined to be 'very bad'.

According to an exemplary embodiment of the present disclosure, a method for controlling a vehicle based on an air condition may include: measuring an external fine dust concentration of the vehicle; receiving, from an environment server, a local fine dust concentration corresponding to a position of the vehicle; and when a difference between the measured external fine dust concentration and the received local fine dust concentration exceeds a set allowance, checking whether an object generating fine dust exists outside the vehicle and allowing the vehicle to travel by avoiding the object when it is confirmed that the object exists.

According to an exemplary embodiment of the present disclosure, the step of allowing the vehicle to travel by avoiding the object may include confirming that the object generating the fine dust exists when an object positioned at a set short distance is detected from a result of monitoring an external environment of the vehicle, and allowing the vehicle to travel by avoiding the object when an external fine dust concentration periodically measured by an outdoor measurement sensor continuously increases for a set time.

According to an exemplary embodiment of the present disclosure, the step of allowing the vehicle to travel by avoiding the object may further include when a plurality of objects is detected from the monitoring result, making distances from the plurality of objects different from each other by moving the vehicle to left or right side, and identifying an object positioned relatively far from the vehicle as the object generating the fine dust at a moment when the external fine dust concentration measured by the outdoor measurement sensor decreases.

According to an exemplary embodiment of the present disclosure, the method may further include, when it is confirmed that the object generating the fine dust does not exist, but the external fine dust concentration periodically measured by the outdoor measurement sensor continuously increases for a set time, searching for a detour route up to a destination of the vehicle and allowing the vehicle to travel on the detour route instead of an existing route when the difference in each travel time to the destination of the vehicle between the existing route and the detour route is within a predetermined range.

According to an exemplary embodiment of the present disclosure, the method may further include, when the difference in each travel time between the existing route and the detour route is out of a predetermined range, providing the travel time in each of the existing route and the detour route through an outputter and allowing the vehicle to travel on a route selected from among the existing route and the detour route.

According to an exemplary embodiment of the present disclosure, the method may further include counting the number of avoidances for the object generating fine dust, when the counted number of avoidances is equal to or greater than a set number of times, searching for the detour route to the destination of the vehicle, and when the difference in each traveling time to the destination of the vehicle between the existing route and the detour route to the destination of the vehicle is within a predetermined range, allowing the vehicle to travel on the detour route instead of the existing route.

According to an exemplary embodiment of the present disclosure, the method may further include determining an outdoor air condition of the vehicle based on the measured external fine dust concentration and setting an air circulation mode of the vehicle according to the determined result.

According to an exemplary embodiment of the present disclosure, the step of setting the air circulation mode may include setting the air circulation mode to the outdoor air circulation mode when the outdoor air condition of the vehicle is determined to be 'good' based on a pre-set step-by-step criterion according to the determined result, and setting the air circulation mode to the indoor air circulation mode when the outdoor air condition of the vehicle is determined to be 'normal', 'bad', or 'very bad' based on the pre-set step-by-step criterion according to the determined result.

According to an exemplary embodiment of the present disclosure, the method may further include: measuring an internal fine dust concentration of the vehicle; and determining an indoor air condition of the vehicle based on the measured internal fine dust concentration and adjusting an operation strength of an indoor air cleaner in the vehicle differently depending on the determined result.

According to an exemplary embodiment of the present disclosure, the step of adjusting the operation strength of the indoor air cleaner in the vehicle differently may include, according to the determined result, turning off the indoor air cleaner when the indoor air condition of the vehicle is determined to be 'good', adjusting the operation strength of the indoor air cleaner to 'low' when the indoor air condition of the vehicle is determined to be 'normal', adjusting the operation strength of the indoor air cleaner to 'medium' when the indoor air condition of the vehicle is determined to be 'bad', and adjusting the operation strength of the indoor air cleaner to 'high' when the indoor air condition of the vehicle is determined to be 'very bad'.

Besides, another method and another system for implementing the present disclosure, and a computer-readable recording medium storing a computer program for executing the method may be further provided.

Other aspects, features, and advantages other than those described above will become apparent from the following drawings, claims, and detailed description of the invention.

According to the present disclosure, when there is an object to contaminate air outside a vehicle at a set short distance, the vehicle is prevented from being exposed to air contaminated by the object by controlling the vehicle to travel while avoiding the object.

According to the present disclosure, the vehicle is allowed to deviate from an air contaminated area by allowing the vehicle to travel on a detour route to a destination of the vehicle, when there is no object to contaminate air outside the vehicle at the set short distance, but an external air quality of the vehicle deteriorates continuously for a set time.

According to the present disclosure, internal air of the vehicle is made comfortable by operating an air circulation device of the vehicle in an outdoor air circulation mode only when the external air quality of the vehicle is excellent by determining an outdoor air condition of the vehicle based on an external fine dust concentration of the vehicle and setting an air circulation mode of the vehicle according to the determination result.

Further, according to the present disclosure, indoor air of the vehicle can be cleanly managed by adjusting an operation strength of an indoor air cleaner in the vehicle differently depending on the indoor air condition of the vehicle.

Advantages of the present disclosure are not limited to the foregoing features, and any other advantages not mentioned above will become more apparent from the following detailed description to those skilled in the art to which the present disclosure pertains.

BRIEF DESCRIPTION OF THE DRAWINGS

The above and other aspects, features, and advantages of the present disclosure will become apparent from the detailed description of the following aspects in conjunction with the accompanying drawings, in which:

FIG. 1 is a diagram illustrating a configuration of a network including an apparatus for controlling a vehicle according to an exemplary embodiment of the present disclosure;

FIG. 2 is a diagram illustrating a configuration of an apparatus for controlling a vehicle according to an exemplary embodiment of the present disclosure;

FIG. 3 is a flowchart for describing an example of determining an outdoor air condition in an apparatus for controlling a vehicle according to an exemplary embodiment of the present disclosure;

FIG. 4 is a flowchart for describing an example of determining an indoor air condition in an apparatus for controlling a vehicle according to an exemplary embodiment of the present disclosure;

FIG. 5 is a diagram for describing an example of controlling a vehicle by an apparatus for controlling a vehicle according to an exemplary embodiment of the present disclosure;

FIG. 6 is a diagram for describing another example of controlling a vehicle by an apparatus for controlling a vehicle according to an exemplary embodiment of the present disclosure;

FIG. 7 is a diagram for describing an example of checking an object to generating fine dust by an apparatus for controlling a vehicle according to an exemplary embodiment of the present disclosure;

FIG. 8 is a flowchart showing an example of a method for controlling a vehicle according to an exemplary embodiment of the present disclosure;

FIG. 9 is a flowchart showing a method for controlling an air circulation mode of a vehicle by an apparatus for controlling a vehicle according to an exemplary embodiment of the present disclosure; and FIG. 10 is a flowchart showing a method for controlling an indoor air cleaner of a vehicle by an apparatus for controlling a vehicle according to an exemplary embodiment of the present disclosure.

DETAILED DESCRIPTION

Advantages and features of the present disclosure and methods of achieving the advantages and features will be more apparent with reference to the following detailed description of embodiments in connection with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally only used to distinguish one element from another.

Hereinbelow, the embodiments of the present disclosure will be described in greater detail with reference to the accompanying drawings, and on all these accompanying drawings, the identical or analogous elements are designated by the same reference numeral, and repetitive description of the common elements will be omitted.

A concept of fine dust described herein may include ultrafine dust and super ultrafine dust.

A concept of the vehicle described in the specification may include, but is not limited to, a vehicle having an internal combustion engine as a power source, a hybrid vehicle having an engine and an electric motor as a power source, and an electric vehicle having an electric motor as a power source.

In addition, a vehicle described in this specification may be an autonomous driving vehicle. The autonomous driving vehicle may be a vehicle that is autonomously driven up to a predetermined destination by controlling the vehicle through recognizing a surrounding environment and determining a driving situation during driving without intervention by a driver by mounting systems equipped with an algorithm for autonomous driving. The system may include a software module or a hardware module (hereinafter, referred to as an artificial intelligence module) for implementing artificial intelligence (AI). The artificial intelligence module may train a series of processes related to driving by performing machine learning on data input related to driving using at least one artificial neural network (ANN). The autonomous driving vehicle may autonomously control the vehicle without the intervention by the driver by using the artificial intelligence module.

FIG. 1 is a diagram illustrating a configuration of a network including an apparatus for controlling a vehicle according to an exemplary embodiment of the present disclosure.

Referring to FIG. 1, a network 100 may include an environment server 101 and a vehicle control apparatus 102.

The environment server 101 may be managed by the Ministry of Environment (or the Korea Meteorological Agency), and analyze a result of observing a local air quality to periodically obtain a fine dust concentration for each region (e.g., city and district), or periodically obtain the fine dust concentration for each region from a measurement sensor installed for each region.

The environment server 101 may communicate with the vehicle control apparatus 102 via a wireless network, and periodically provide the fine dust concentration of the corresponding region to the vehicle control apparatus 102 based on a position of a vehicle 103 controlled by the vehicle control apparatus 102.

The vehicle control apparatus 102 may be installed in the vehicle 103 as an apparatus for controlling the vehicle 103 based on an air condition.

When an object that contaminates air exists outside the vehicle 103, the vehicle control apparatus 102 may control the vehicle 103 to travel while avoiding the object. Specifically, the vehicle control apparatus 102 may receive the local fine dust concentration corresponding to the position of the vehicle 103 from the environment server 101 and compare an external fine dust concentration measured by an outdoor measurement sensor attached to an exterior of the vehicle 103 with the received local fine dust concentration. In this case, as a result of the comparison, when a difference between the measured external fine dust concentration and the received local fine dust concentration exceeds a set allowance, the vehicle control apparatus 102 may check whether an object that generates the fine dust outside the vehicle 103 and control the vehicle 103 to travel while avoiding the object when it is confirmed that the object that generates the fine dust exists. That is, the vehicle control apparatus 102 determines that external air of the vehicle is temporarily contaminated due to the object generating the fine dust and allows the vehicle 103 to avoid the object to prevent the vehicle 103 from being exposed to air contaminated by the object, thereby providing an environment in which an air circulation mode of the vehicle may be set to an outdoor air circulation mode without being limited by the object generating the fine dust when a weather is good and the external air is good.

When it is confirmed that the object generating the fine dust does not exist, the vehicle control apparatus 102 searches for a detour route up to a destination of the vehicle and when the difference in each travel time to the destination of the vehicle between an existing route (a route in which the vehicle travels) and the detour route is within a predetermined range, the vehicle control apparatus 102 allows the vehicle to travel on the detour route instead of the existing route. That is, the vehicle control apparatus 102 determines that the external air of the vehicle is contaminated due to a local feature (e.g., a factory zone that may generate a lot of fine dust) and allows the vehicle 103 to travel on the detour route to allow the vehicle 103 to deviate from a region where the air is contaminated, thereby providing an environment in which the air circulation mode of the vehicle may be set to the outdoor air circulation mode without being limited by the local feature when the weather is good and the external air is good.

Further, the vehicle control apparatus 102 may determine an outdoor air condition of the vehicle 103 based on the external fine dust concentration measured by the outdoor measurement sensor and set the air circulation mode of the vehicle according to the determined result. In this case, when the outdoor air condition of the vehicle 103 is good according to the determined result, the vehicle control apparatus 102 sets the air circulation mode to the outdoor air circulation mode and operates an air circulation apparatus of the vehicle 103 in the outdoor air circulation mode to make external air having a good quality flow into the vehicle 103, thereby circulating the air.

On the contrary, when the outdoor air condition of the vehicle 103 is not good according to the determined result, the vehicle control apparatus 102 may set the air circulation mode to the indoor air circulation mode and operate an air circulation apparatus of the vehicle 103 in the indoor air circulation mode, thereby circulating the air only in the vehicle 103 without inflow external air having a poor quality. As a result, the vehicle control apparatus 102 may flexibly set the air circulation mode based on the outdoor air condition of the vehicle 103, thereby keeping indoor air of the vehicle 103 comfortably without being affected by a change of the outdoor air condition of the vehicle 103.

In addition, the vehicle control apparatus 102 may measure an internal fine dust concentration of the vehicle 103 through an indoor measurement sensor attached to the interior of the vehicle 103 and determine the indoor air condition of the vehicle based on the measured internal fine dust concentration. The vehicle control apparatus 102 may cleanly manage the internal air of the vehicle 103 by adjusting the operation strength of the indoor air cleaner differently depending on the determined result.

FIG. 2 is a diagram illustrating a configuration of an apparatus for controlling a vehicle according to an exemplary embodiment of the present disclosure.

Referring to FIG. 2, a vehicle control apparatus 200 may include a monitor 201, a measurer 202, a communicator 205, and a controller 206. Here, the controller 206 may communicate with the monitor 201, the measurer 202, the communicator 205, and an outputter (not illustrated), for example, based on controller area network (CAN) communication and perform all functions to controlling the vehicle, which include air circulation mode setting, indoor air cleaner operation control, route change, and the like, based on the CAN communication.

The monitor 201 may be, for example, a radar, a lidar, and a camera and may be attached to the exterior of the vehicle. Here, the radar may include an electromagnetic wave transmitter and an electromagnetic wave receiver and may be implemented in a pulse radar scheme or a continuous wave radar scheme in terms of a radio wave emission principle. The lidar may include a laser transmitter and a laser receiver and may be implemented in a time of flight (TOF) scheme or a phase-shift scheme. Further, the camera may be, for example, a mono camera, a stereo camera, an around view monitoring (AVM) camera, or a 360 degree camera.

The monitor 201 may be, for example, installed on at least one of a front surface, a side surface, and a rear surface of the vehicle to monitor an external environment of the vehicle.

The measurer 202 may include an outdoor measurement sensor 203 and an indoor measurement sensor 204.

The outdoor measurement sensor 203 is attached to the exterior (e.g., the front surface and the rear surface) of the vehicle to measure the external fine dust concentration at a set period.

The indoor measurement sensor 204 is attached to an interior of the vehicle to measure the internal fine dust concentration at a set period.

The communicator 205 may receive the local fine dust concentration corresponding to the position of the vehicle from the environment server at every set period or transmit to the environment server a local fine dust concentration request according to a set condition (for example, when a region (city, district, or town) to which the position of the vehicle belongs is changed) and receive from the environment server the local fine dust concentration corresponding to the position of the vehicle in response to the request.

For example, when the vehicle travels 'Yangjae-dong', the communicator 205 may receive from the environment server a local fine dust concentration of 'Seocho-gu' including 'Yangjae-dong' as the local fine dust concentration corresponding to 'Yangjae-dong' at a set period. In addition, for example, when the vehicle travels from 'Seocho-gu' to 'Gaepo-dong' and the position of the vehicle is accordingly changed, the communicator 205 may transmit the local fine dust concentration request to the environmental server and receive from the environment server a local fine dust concentration (local fine dust concentration in 'Gangnam-gu' including 'Gaepo-dong') corresponding to 'Gaepo-dong' in response to the request.

When the difference (for example, a value acquired by subtracting the local fine dust concentration from the external fine dust concentration) between the external fine dust concentration measured by the outdoor measurement sensor 203 and the local fine dust concentration received from the environment server exceeds a set allowance, the controller 206 may check whether an object (e.g., a diesel vehicle) generating the fine dust exists outside the vehicle. In this case, when an object positioned at a set short distance is detected from a monitoring result of the monitor 201, the controller 206 may confirm that the object generating the fine dust exists. Here, for example, when a video is captured as a result of monitoring, the controller 206 performs an in-depth neural network model on the video to quickly detect the object from the video. Here, the in-depth neural network model is a learning model trained in advance so as to recognize the object in the video.

When it is confirmed that the object generating the fine dust exists, the controller 206 allows the vehicle to travel while avoiding the object. That is, when it is determined that the external air of the vehicle is contaminated and the object is confirmed as an entity that contaminates the external air of the vehicle, based on the difference between the measured external fine dust concentration and the received local fine dust concentration, the controller 206 allows the vehicle to move away from the object by overtaking the object, thereby preventing the vehicle from being exposed to the air contaminated by the object.

As another example, when the controller 206 additionally checks whether the external fine dust concentration periodically measured by the outdoor measurement sensor 203 continuously increases for a set time (e.g., 10 seconds) and confirms that the external fine dust concentration increases while the object exists, the controller 206 may allow the vehicle to travel while avoiding the object, thereby controlling the vehicle after more accurately checking whether the object is the entity that contaminates the external air of the vehicle.

When the object is detected, the controller 206 may make the distances from the plurality of objects different from each other by moving the vehicle to the left or the right when a plurality of objects is detected in the monitoring result, and identify an object (i.e., an object positioned farthest from the vehicle) positioned at a relatively far distance from the vehicle as the object generating the fine dust at a moment when the external fine dust concentration measured by the outdoor measurement sensor decreases. For example, the controller 206 moves the vehicle to a right side lane and then, when the external fine dust concentration measured by the outdoor measurement sensor is lower than the external fine dust concentration measured by the outdoor measurement sensor immediately before moving the vehicle to the right side lane, the controller 206 may identify the object positioned relatively far from the vehicle, i.e., an object positioned at the left side as the object generating the fine dust.

That is, the controller 206 may identify the contaminated object that generates the fine dust, based on the change of the external fine dust concentration of the vehicle according to the change of the distance between the vehicle and a contamination candidate object, among contamination candidate objects that may generate the fine dust.

In addition, when identifying the object generating the fine dust and making the distances from the plurality of objects different from each other by moving the vehicle to the left or the right in a case where the outdoor measurement sensor is respectively attached onto both side surfaces of the vehicle, the controller 206 may compare the external fine dust concentrations measured by the outdoor measurement sensors respectively attached onto both side surfaces of the vehicle, and identify the object generating the fine dust based on the comparison result. In this case, the controller 206 may identify, among the plurality of objects, an object existing in a direction in which a relatively large external fine dust concentration is measured as the object generating the fine dust. For example, when a plurality of objects traveling in front of the vehicle is detected as a result of the monitoring, the controller 206 moves the vehicle to the right side lane and at this time, when the external fine dust concentration measured by the outdoor measurement sensor attached to the left side of the vehicle is larger than the external fine dust concentration measured by the outdoor measurement sensor attached to the right side of the vehicle, the controller may identify an object positioned at the left side of the plurality of objects as the object that generates the fine dust.

On the other hand, as a result of confirming the existence of the object that generates the fine dust from the outside of the vehicle as the difference between the measured external fine dust concentration and the received local fine dust concentration exceeds the set allowance, when it is confirmed that the object does not exist, the controller 206 may search for the detour route to the destination of the vehicle. The controller 206 allows the vehicle to travel in the detour route instead of the existing route when the difference in each travel time to the destination of the vehicle between the existing route and the detour route is within a predetermined range. That is, when the controller 206 determines that the external air of the vehicle is contaminated based on the difference between the measured external fine dust concentration and the received local fine dust concentration, but when it is confirmed that there is no specific entity that contaminates the external air of the vehicle, the controller 206 determines that the external air of the vehicle is contaminated due to a local feature (e.g., factory zone) and allows the vehicle to travel on the detour route, thereby allowing the vehicle to deviate from an air contaminated region.

As another example, the controller 206 additionally checks whether the external fine dust concentration periodically measured by the outdoor measurement sensor 203 continuously increases for a set time (e.g., 20 seconds), and when it is confirmed that the external fine dust concentration increases, the controller 206 allows the vehicle to travel through the detour route, thereby controlling the vehicle to travel in other regions after more accurately checking whether the corresponding region is a region where the air is contaminated relatively more than other regions.

Further, when the difference in each travel time between the existing route and the detour route is out of a predetermined range, the controller 206 provides the travel time in each of the existing route and the detour route through an outputter (not illustrated) (e.g., an audio video navigation (AVN) screen) and allows the vehicle to travel on a route selected from among the existing route and the detour route.

In addition, the controller 206 counts the number of avoidances for the object generating fine dust, and when the counted number of avoidances is equal to or greater than a set number of times, the controller 206 searches for the detour route to the destination of the vehicle and when the difference in each travel time between the existing route and the detour route is within a predetermined range, the controller 206 allows the vehicle to travel on the detour route instead of the existing route. That is, when there are many objects generating the fine dust around in the existing route, the controller 206 allows the vehicle to travel on the detour route, thereby allowing the vehicle to deviate the air contaminated region.

Further, the controller 206 may determine the outdoor air condition of the vehicle based on the external fine dust concentration measured by the outdoor measurement sensor 203 and set the air circulation mode according to the determined result. In this case, the controller 206 may set the air circulation mode to the outdoor air circulation mode when the outdoor air condition of the vehicle is determined to be 'good' based on a pre-set step-by-step criterion according to the determined result. That is, when it is determined that the outdoor air condition of the vehicle is 'good', the controller 206 operates the air circulation apparatus of the vehicle in the outdoor air circulation mode, thereby introducing good quality external air into the vehicle to circulate the air.

In this case, when an indoor temperature of the vehicle increases above a set temperature as the external air flows into the vehicle, the vehicle control apparatus turns on an air conditioning of the vehicle and operates the air conditioning in a cooling mode, thereby making it possible for an occupant to feel the indoor air of the vehicle comfortably.

On the contrary, the controller 206 may set the air circulation mode to the indoor air circulation mode when the outdoor air condition of the vehicle is determined to be 'normal', 'bad', or 'very bad' based on the pre-set step-by-step criterion according to the determined result. That is, when it is determined that the outdoor air condition of the vehicle is not 'good', the controller 206 operates the air circulation apparatus of the vehicle in the indoor air circulation mode, thereby circulating the air only in the vehicle without introducing the external air having the poor quality.

As a result, the controller 206 sets the air circulation mode in accordance with the outdoor air condition of the vehicle and operates the vehicle air circulation apparatus in the outdoor air circulation mode only when the external air quality of the vehicle is good, thereby keeping the internal air of the vehicle comfortably.

When it is confirmed that rain or snow falls from the monitoring result of the monitor 201, the controller 206 may set the air circulation mode to the indoor air circulation mode regardless of the outdoor air condition of the vehicle, thereby preventing wet air from flowing into the vehicle.

Further, the controller 206 may determine the indoor air condition of the vehicle based on the measured internal fine dust concentration measured by the indoor measurement sensor 204 and adjust the operation strength of the indoor air cleaner in the vehicle differently depending on the determined result, thereby cleanly managing the internal air of the vehicle. In this case, when it is determined that the indoor air condition of the vehicle is 'good' according to the determined result, the controller may turn off the indoor air cleaner, and when it is determined that the indoor air condition of the vehicle is 'normal', the controller 206 may adjust the operation strength of the indoor air cleaner to 'low'. In addition, when it is determined that the indoor air condition of the vehicle is 'bad', the controller 206 may adjust the operation strength of the indoor air cleaner to 'medium', and when it is determined that the indoor air condition of the vehicle is 'very bad', the controller 206 may adjust the operation strength of the indoor air cleaner to 'high'.

FIG. 3 is a flowchart for describing an example of determining an outdoor air condition in an apparatus for controlling a vehicle according to an exemplary embodiment of the present disclosure.

Referring to FIG. 3, the vehicle control apparatus may measure the external fine dust concentration of the vehicle and determine the outdoor air condition of the vehicle based on the measured external fine dust concentration. In this case, the vehicle control apparatus may determine the outdoor air condition of the vehicle based on a pre-set step-by-step criterion 300.

For example, the vehicle control apparatus may measure the external fine dust concentration of the vehicle through the outdoor measurement sensor attached to the exterior of the vehicle (301).

When the external fine dust concentration measured by the outdoor measurement sensor is equal to or smaller than a first set value (e.g., 15 μg/m$^3$) (302), the vehicle control apparatus may determine the outdoor air condition of the vehicle as a 'good' state (303) and when the external fine dust concentration measured by the outdoor measurement sensor exceeds the first set value but is smaller than or equal to a second set value (e.g., 50 μg/m$^3$) (304), the vehicle control apparatus may determine that the outdoor air condition is a 'normal' state (305). Further, when the external fine dust concentration measured by the outdoor measurement sensor exceeds the second set value, but is smaller than or equal to a third set value (e.g., 100 μg/m$^3$) (306), the vehicle control apparatus may determine that the outdoor air condition is a 'bad' state (307) and when the external fine dust concentration measured by the outdoor measurement sensor exceeds the third set value, the vehicle control apparatus may determine that the outdoor air condition is a 'very bad' state (308).

FIG. 4 is a flowchart for describing an example of determining an indoor air condition in an apparatus for controlling a vehicle according to an exemplary embodiment of the present disclosure.

Referring to FIG. 4, the vehicle control apparatus may measure the internal fine dust concentration of the vehicle and determine the indoor air condition of the vehicle based on the measured internal fine dust concentration. In this case, the vehicle control apparatus may determine the indoor air condition of the vehicle based on a pre-set step-by-step criterion 400 similarly to determination of the outdoor air condition of the vehicle. Here, the pre-set step-by-step criterion 400 may be the same as the step-by-step criterion used when determining the outdoor air condition of the vehicle but is not limited thereto.

For example, the vehicle control apparatus may measure the internal fine dust concentration of the vehicle through the indoor measurement sensor attached to the interior of the vehicle (401).

When the internal fine dust concentration measured by the indoor measurement sensor is equal to or smaller than a first set value (e.g., 15 μg/m$^3$) (402), the vehicle control apparatus may determine the indoor air condition of the vehicle as the 'good' state (403) and when the internal fine dust concentration measured by the indoor measurement sensor exceeds the first set value but is smaller than a second set value (e.g., 50 μg/m$^3$) (404), the vehicle control apparatus may determine that the indoor air condition is the 'normal' state (405). Further, when the internal fine dust concentration measured by the indoor measurement sensor exceeds the second set value, but is smaller than a third set value (e.g., 100 μg/m$^3$) (406), the vehicle control apparatus may determine that the indoor air condition is the 'bad' state (407) and when the internal fine dust concentration measured by the indoor measurement sensor exceeds the third set value, the vehicle control apparatus may determine that the indoor air condition is the 'very bad' state (408).

FIG. 5 is a diagram for describing an example of controlling a vehicle by an apparatus for controlling a vehicle according to an exemplary embodiment of the present disclosure.

Referring to FIG. 5, when the outdoor air of a vehicle 501 in which a vehicle control apparatus 500 is installed is contaminated by a specific object, the vehicle control apparatus 500 may control the vehicle 501 to travel while avoiding the object.

For example, when the local fine dust concentration received from the environment server is 15 μg/m$^3$ and the external fine dust concentration measured by the outdoor measurement sensor of the vehicle is 55 μg/m$^3$, the vehicle control apparatus 500 may check whether the object generating the fine dust exists outside the vehicle as a value 40 acquired by subtracting the local fine dust concentration from the external fine dust concentration exceeds a set allowance 10.

For example, when a 'diesel vehicle' 502 is extracted as the object from a video obtained from a camera, the vehicle control apparatus may obtain the position of the 'diesel vehicle' 502 based on the video and when it is determined that the 'diesel vehicle' 502 exists within a set short distance (e.g., 20 m), the vehicle control apparatus may control the vehicle 501 to travel while avoiding the 'diesel vehicle' 502 in the existing route to the destination of the vehicle. In this case, the vehicle control apparatus allows the vehicle 501 to overtake the 'diesel vehicle,' thereby allowing the vehicle 501 to avoid the object generating the fine dust based on a surrounding environment (e.g., movement of other vehicles on a lane on which the vehicle travels and a side lane).

FIG. 6 is a diagram for describing another example of controlling a vehicle by an apparatus for controlling a vehicle according to an exemplary embodiment of the present disclosure.

Referring to FIG. 6, when the outdoor air of a vehicle 601 equipped with a vehicle control apparatus 600 is contaminated due to a local feature (e.g., a region where a factory, a power plant, a farm, etc., is positioned), the vehicle control apparatus 600 may control the vehicle 601 to travel to another region.

When the value obtained by subtracting the local fine dust concentration received from the environment server from the external fine dust concentration measured by the outdoor measurement sensor exceeds a set allowance, the vehicle control apparatus 600 may check whether the object generating the fine dust exists outside the vehicle. In this case, when it is confirmed that the object generating the fine dust does not exist, but the external fine dust concentration periodically measured by the outdoor measurement sensor continuously increases for a set time, the vehicle control apparatus 600 searches for the detour route to the destination of the vehicle and when the difference in each travel time between the existing route on which the vehicle travels and the detour route is within a predetermined range (e.g., 0 to 10 minutes), the vehicle control apparatus 600 allows the vehicle to travel on the detour route instead of the existing route.

When checking the existence of the object generating the fine dust, the vehicle control apparatus 600 may confirm that the object generating the fine dust does not exist, for example, in a case where the object is not detected from the video acquired from the camera or the vehicle extracted as the object from the video is positioned out of a set short distance.

Meanwhile, when the difference in each travel time between an existing route 602 and a detour route 603 is out of a predetermined range, the vehicle control apparatus 600 provides the travel time in each of the existing route 602 and the detour route 603 through the outputter and allows the vehicle to travel on a route selected from among the existing route and the detour route.

FIG. 7 is a diagram for describing an example of checking an object to generating fine dust by an apparatus for controlling a vehicle according to an exemplary embodiment of the present disclosure.

Referring to FIG. 7, when the outdoor air of a vehicle 701 in which a vehicle control apparatus 700 is installed is contaminated by a specific object, the vehicle control apparatus 700 may control the vehicle 701 to travel while avoiding the object.

The vehicle control apparatus 700 checks whether the object generating the fine dust exists outside the vehicle 701 and when it is confirmed that the object exists and the external fine dust concentration periodically measured by the outdoor measurement sensor continuously increases for a set time, the vehicle control apparatus 700 allows the vehicle 701 to travel while avoiding the object.

When the object is detected, for example, the vehicle control apparatus 700 may make the distances from a 'first vehicle' 702 and a 'second vehicle' 703 different from each other by moving the vehicle 701 to the left or the right side when the 'first vehicle' 702 and the 'second vehicle' 703 are extracted as the object in the video acquired from the camera, and identify a vehicle which is positioned relatively far from the vehicle 701 as the object generating the fine dust at a moment when the external fine dust concentration measured by the outdoor measurement sensor decreases. For example, the vehicle control apparatus 700 moves the vehicle 701 to the right side lane and then, when the external fine dust concentration measured by the outdoor measurement sensor is lower than the external fine dust concentration measured by the outdoor measurement sensor immediately before moving the vehicle to the right side lane, the vehicle control apparatus 700 may identify the object positioned relatively far from the vehicle 701, i.e., the 'first vehicle' 702 as the object generating the fine dust.

Thereafter, the vehicle control apparatus 700 allows the vehicle 701 to overtake the 'first vehicle' 702, thereby allowing the vehicle 701 to avoid the object generating the fine dust based on a surrounding environment (e.g., movement of other vehicles on a lane on which the vehicle travels and a side lane).

FIG. 8 is a flowchart showing an example of a method for controlling a vehicle according to an exemplary embodiment of the present disclosure.

Referring to FIG. 8, in step 801, the vehicle control apparatus may measure the external fine dust concentration of the vehicle in the outdoor measurement sensor attached to the exterior of the vehicle. In this case, the vehicle control apparatus may receive the local fine dust concentration corresponding to the position of the vehicle from the environment server and compare the received local fine dust concentration and the measured external fine dust concentration.

In step 802, when the difference between the measured external fine dust concentration and the received local fine dust concentration exceeds a set allowance, the vehicle control apparatus may check whether the object generating the fine dust exists outside the vehicle in step 803.

In step 804, when it is confirmed that the object generating the fine dust exists, the vehicle control apparatus allows the vehicle to travel while avoiding the object in step 805.

In this case, the vehicle control apparatus may monitor the external environment of the vehicle using at least one of, for example, a radar, a lidar, and a camera and when the object is detected from the monitoring result, the vehicle control apparatus may confirm that the object generating the fine dust exists.

As another example, the vehicle control apparatus may additionally check whether the external fine dust concentration periodically measured by the outdoor measurement sensor continuously increases for a set time and when it is confirmed that the external fine dust concentration increases while the object exists, the vehicle control apparatus allows the vehicle to travel while avoiding the object.

When the object is detected, the vehicle control apparatus may make the distances from the plurality of objects different from each other by moving the vehicle to the left or the right when a plurality of objects is detected in the monitoring result, and identify an object positioned at a relatively far distance from the vehicle as the object generating the fine dust at a moment when the external fine dust concentration measured by the outdoor measurement sensor decreases.

In step S806, the vehicle control apparatus may determine the outdoor air condition of the vehicle based on the external fine dust concentration of the vehicle and set the air circulation mode of the vehicle according to the determined result. A method for setting the air circulation mode of the vehicle will be described below with reference to FIG. 9.

In step 804, when it is confirmed that the object generating the fine dust does not exist, the vehicle control apparatus may search for the detour route to the destination of the vehicle in step 807. In this case, when an object positioned at a set short distance is not detected from the monitoring result, the vehicle control apparatus may confirm that the object generating the fine dust does not exist.

As another example, the vehicle control apparatus may additionally check whether the external fine dust concentration periodically measured by the outdoor measurement sensor continuously increases for a set time and when it is confirmed that the object is not detected, but the external fine dust concentration increases, the vehicle control apparatus may search for the detour route to the destination of the vehicle.

In step S808, when the difference in each travel time to the destination of the vehicle between the existing route and the detour route is within a predetermined range, the vehicle control apparatus allows the vehicle to travel on the detour route instead of the existing route in step 809.

In step S808, when the difference in each travel time between the existing route and the detour route is out of a predetermined range, the vehicle control apparatus may provide the travel time in each of the existing route and the detour route through the outputter and receive a selection for the route among the existing route and the detour route in step 810.

In step 811, the vehicle control apparatus allows the vehicle to travel on the route selected from among the existing route and the detour route.

Further, in step S805, the vehicle control apparatus may count the number of avoidances for the object generating the fine dust and when the counted number of avoidances is equal to or more than a set number of times, the vehicle control apparatus may allow the vehicle to travel on the detour route by moving to step 807.

FIG. 9 is a flowchart showing a method for controlling an air circulation mode of a vehicle by an apparatus for controlling a vehicle according to an exemplary embodiment of the present disclosure.

Referring to FIG. 9, in step 901, the vehicle control apparatus may measure the external fine dust concentration of the vehicle through the outdoor measurement sensor attached to the exterior of the vehicle and determine the outdoor air condition of the vehicle based on the measured external fine dust concentration. In this case, the vehicle control apparatus may determine the outdoor air condition of the vehicle based on a pre-set step-by-step criterion.

In step 902, when the outdoor air condition of the vehicle is determined to be 'good' according to the determined result, the vehicle control apparatus may set the air circulation mode of the vehicle to the outdoor air circulation mode in step 903. That is, when it is determined that the outdoor air condition of the vehicle is 'good', the vehicle control apparatus operates the air circulation apparatus of the vehicle in the outdoor air circulation mode, thereby introducing good quality external air into the vehicle to circulate the air. In this case, the vehicle control apparatus opens a window of the vehicle to more smoothly circulate the air.

Further, when the indoor temperature of the vehicle increases above a set temperature as the external air flows into the vehicle, the vehicle control apparatus turns on the air conditioning of the vehicle, operates the air conditioning in the cooling mode, and closes the window of the vehicle to maintain an appropriate temperature, thereby making it possible for the occupant to feel the indoor air of the vehicle comfortably.

In step 902, when the outdoor air condition of the vehicle is determined to be not 'good' (e.g., 'normal', 'bad', or 'very bad'), the vehicle control apparatus may set the air circulation mode of the vehicle to the indoor air circulation mode. That is, when it is determined that the outdoor air condition of the vehicle is not 'good', the vehicle control apparatus operates the air circulation apparatus of the vehicle in the indoor air circulation mode, thereby circulating the air only in the vehicle without introducing the external air having the poor quality. In this case, the vehicle control apparatus closes the window of the vehicle to prevent inflow of the external air having the poor quality.

Further, the vehicle control apparatus may turn off an air conditioning and operate the air conditioning in a blowing mode, and as a result, the inside of the air conditioning of the vehicle is dried to prevent an unpleasant smell from being generated from the air conditioning.

In addition, the vehicle control apparatus may check whether rain or snow falls, and when it is confirmed that the rain or snow falls, the vehicle control apparatus sets the air circulation mode of the vehicle to the indoor air circulation mode regardless of the outdoor air condition of the vehicle to manage the indoor air of the vehicle comfortably without being affected by a change in weather.

As a result, the vehicle control apparatus determines the outdoor air condition of the vehicle and set the air circulation mode of the vehicle according to the determined result, thereby keeping the indoor air of the vehicle comfortable.

FIG. 10 is a flowchart showing a method for controlling an indoor air cleaner of a vehicle by an apparatus for controlling a vehicle according to an exemplary embodiment of the present disclosure.

Referring to FIG. 10, in step 1001, the vehicle control apparatus may measure the internal fine dust concentration of the vehicle through the indoor measurement sensor attached to the interior of the vehicle and determine the indoor air condition of the vehicle based on the measured internal fine dust concentration. In this case, the vehicle control apparatus may determine the indoor air condition of the vehicle based on a pre-set step-by-step criterion.

In step 1002, when the indoor air condition of the vehicle is determined to be 'good' according to the determined result, the vehicle control apparatus may turn off the indoor air cleaner of the vehicle in step 1003.

In step 1002, when it is determined that the indoor air condition of the vehicle is not 'good', the vehicle control apparatus determines whether the indoor air condition of the vehicle is 'normal'.

In step 1004, when the indoor air condition of the vehicle is determined to be 'normal', the vehicle control apparatus may adjust the indoor air cleaner of the vehicle to 'low' in step 1005.

In step 1004, when it is determined that the indoor air condition of the vehicle is not 'normal', the vehicle control apparatus determines whether the indoor air condition of the vehicle is 'bad'.

In step 1006, when the indoor air condition of the vehicle is determined to be 'bad', the vehicle control apparatus may adjust the indoor air cleaner of the vehicle to 'medium' in step 1007.

In step 1006, when it is determined that the indoor air condition of the vehicle is not 'bad', the vehicle control apparatus may determine that the indoor air condition of the vehicle is 'very bad'. In this case, in step 1008, the vehicle control apparatus may adjust the indoor air cleaner of the vehicle to 'high'.

The vehicle control apparatus determines the indoor air condition of the vehicle and adjusts the operation strength of the indoor air cleaner of the vehicle differently depending on the determined result to clearly manage the internal air of the vehicle.

The above-mentioned embodiments of the present disclosure may be implemented as a computer program executable in computer(s) through various constituent elements. The above-mentioned computer program may be recorded in a computer-readable medium. Examples of the computer-readable medium may include magnetic media such as a hard disk drives (HDD), floppy disks and a magnetic tapes, optical media such as CD-ROMs and DVDs, magneto-optical media such as floptical disks, or hardware devices such as ROMs, RAMs, and flash memories specifically configured to store and execute program commands.

In addition, the above computer programs may be specially designed and configured for the present disclosure, or may be known to those skilled in the field of computer software. Examples of program code include both a machine code, such as produced by a compiler, and a higher-level code that may be executed by the computer using an interpreter.

In the present application (especially, in the appended claims), the use of the terms "the", "the above-mentioned", and/or other terms similar thereto may correspond to singular meaning, plural meaning, or both of the singular meaning and the plural meaning as necessary. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The above-mentioned steps constructing the method disclosed in the present disclosure may be performed in a proper order unless explicitly stated otherwise. However, the scope or spirit of the present disclosure is not limited thereto. All examples described herein or the terms indicative thereof ("for example", etc.) used herein are merely to describe the present disclosure in greater detail. In addition, technical ideas of the present disclosure can also be readily implemented by those skilled in the art according to various conditions and factors within the scope of the appended claims to which various modifications, combinations, and changes are added, or equivalents thereof.

Therefore, technical ideas of the present disclosure are not limited to the above-mentioned embodiments, and it is intended that not only the appended claims, but also all changes equivalent to claims, should be considered to fall within the scope of the present disclosure.

What is claimed is:

1. An apparatus for controlling a vehicle based on an air condition, the apparatus comprising:
    an outdoor measurement sensor attached to an exterior of the vehicle and measuring an external fine dust concentration;
    a communicator receiving, from an environment server, a local fine dust concentration corresponding to a position of the vehicle; and
    when a difference between the measured external fine dust concentration and the received local fine dust concentration exceeds a set allowance, a controller checking whether an object generating fine dust exists outside the vehicle and allowing the vehicle to travel while avoiding the object when it is confirmed that the object exists.

2. The apparatus of claim 1, further comprising:
    a monitor monitoring an external environment of the vehicle,
    wherein the controller
    confirms that the object generating the fine dust exists when an object positioned at a set short distance is detected from the monitoring result, and
    allows the vehicle to travel while avoiding the object when an external fine dust concentration periodically measured by the outdoor measurement sensor continuously increases for a set time.

3. The apparatus of claim 2, wherein when a plurality of objects is detected from the monitoring result, the controller makes distances from the plurality of objects different from each other by moving the vehicle to left or right side, and at a moment when the external fine dust concentration measured by the outdoor measurement sensor decreases, the controller identifies an object positioned relatively far from the vehicle as the object generating the fine dust.

4. The apparatus of claim 1, wherein when it is confirmed that the object generating the fine dust does not exist, but the external fine dust concentration periodically measured by the outdoor measurement sensor continuously increases for a set time, the controller searches for a detour route to a destination of the vehicle and allows the vehicle to travel on the detour route instead of an existing route when the difference in each travel time to the destination of the vehicle between the existing route and the detour route is within a predetermined range.

5. The apparatus of claim 4, wherein when the difference in each travel time between the existing route and the detour route is out of a predetermined range, the controller provides the travel time in each of the existing route and the detour route through an outputter and allows the vehicle to travel on a route selected from among the existing route and the detour route.

6. The apparatus of claim 1, wherein the controller counts the number of avoidances for the object generating the fine dust, and when the counted number of avoidances is equal to or greater than a set number of times, the controller searches for the detour route to the destination of the vehicle and when the difference in each travel time between the existing route and the detour route to the destination of the vehicle is within a predetermined range, the controller allows the vehicle to travel on the detour route instead of the existing route.

7. The apparatus of claim 1, wherein the controller determines an outdoor air condition of the vehicle based on the measured external fine dust concentration and sets an air circulation mode of the vehicle according to the determined result.

8. The apparatus of claim 7, wherein when the outdoor air condition of the vehicle is determined to be 'good' based on a pre-set step-by-step criterion according to the determined result, the controller sets the air circulation mode to an outdoor air circulation mode, and when it is determined that the outdoor air condition of the vehicle is determined to 'normal', 'bad', or 'very bad' based on the pre-set step-by-step criterion according to the determined result, the controller sets the air circulation mode to an indoor air circulation mode.

9. The apparatus of claim 1, further comprising:
    an indoor measurement sensor attached to an interior of the vehicle and measuring an internal fine dust concentration,
    wherein the controller determines an indoor air condition of the vehicle based on the measured internal fine dust concentration and sets an operation strength of an indoor air cleaner in the vehicle differently depending on the determined result.

10. The apparatus of claim 9, wherein the controller, according to the determined result,
    turns off the indoor air cleaner when the indoor air condition of the vehicle is determined to be 'good',
    adjusts the operation strength of the indoor air cleaner to 'low' when the indoor air condition of the vehicle is determined to be 'normal',
    adjusts the operation strength of the indoor air cleaner to 'medium' when the indoor air condition of the vehicle is determined to be 'bad', and
    adjusts the operation strength of the indoor air cleaner to 'high' when the indoor air condition of the vehicle is determined to be 'very bad'.

11. A method for controlling a vehicle based on an air condition, the method comprising:
    measuring an external fine dust concentration of the vehicle;
    receiving, from an environment server, a local fine dust concentration corresponding to a position of the vehicle; and
    when a difference between the measured external fine dust concentration and the received local fine dust concentration exceeds a set allowance, checking whether an object generating fine dust exists outside the vehicle and allowing the vehicle to travel while avoiding the object when it is confirmed that the object exists.

12. The method of claim 11, wherein the step of allowing the vehicle to travel by avoiding the object includes
confirming that the object generating the fine dust exists when an object positioned at a set short distance is detected from a result of monitoring an external environment of the vehicle, and
allowing the vehicle to travel while avoiding the object when an external fine dust concentration periodically measured by an outdoor measurement sensor continuously increases for a set time.

13. The method of claim 12, wherein the step of allowing the vehicle to travel by avoiding the object further includes
when a plurality of objects is detected from the monitoring result, making distances from the plurality of objects different from each other by moving the vehicle to left or right side, and
identifying an object positioned relatively far from the vehicle as the object generating the fine dust at a moment when the external fine dust concentration measured by the outdoor measurement sensor decreases.

14. The method of claim 11, further comprising:
when it is confirmed that the object generating the fine dust does not exist, but the external fine dust concentration periodically measured by the outdoor measurement sensor continuously increases for a set time,
searching for a detour route to a destination of the vehicle and allowing the vehicle to travel on the detour route instead of an existing route when the difference in each travel time to the destination of the vehicle between the existing route and the detour route is within a predetermined range.

15. The method of claim 14, further comprising:
when the difference in each travel time between the existing route and the detour route is out of a predetermined range, providing the travel time in each of the existing route and the detour route through an outputter and allowing the vehicle to travel on a route selected from among the existing route and the detour route.

16. The method of claim 11, further comprising:
counting the number of avoidances for the object generating the fine dust,
when the counted number of avoidances is equal to or greater than a set number of times, searching for the detour route to the destination of the vehicle, and,
when the difference in each traveling time between the existing route and the detour route to the destination of the vehicle is within a predetermined range, allowing the vehicle to travel on the detour route instead of the existing route.

17. The method of claim 11, further comprising:
determining an outdoor air condition of the vehicle based on the measured external fine dust concentration and setting an air circulation mode of the vehicle according to the determined result.

18. The method of claim 17, wherein the step of setting the air circulation mode includes, according to the determined result,
setting the air circulation mode to the outdoor air circulation mode when the outdoor air condition of the vehicle is determined to be 'good' based on a pre-set step-by-step criterion, and
setting the air circulation mode to the indoor air circulation mode when the outdoor air condition of the vehicle is determined to be 'normal', 'bad', or 'very bad' based on the pre-set step-by-step criterion.

19. The method of claim 11, further comprising:
measuring an internal fine dust concentration of the vehicle; and
determining an indoor air condition of the vehicle based on the measured internal fine dust concentration and adjusting an operation strength of an indoor air cleaner in the vehicle differently depending on the determined result.

20. The method of claim 19, wherein the step of adjusting the operation strength of the indoor air cleaner in the vehicle differently includes, according to the determined result,
turning off the indoor air cleaner when the indoor air condition of the vehicle is determined to be 'good',
adjusting the operation strength of the indoor air cleaner to 'low' when the indoor air condition of the vehicle is determined to be 'normal',
adjusting the operation strength of the indoor air cleaner to 'medium' when the indoor air condition of the vehicle is determined to be 'bad', and
adjusting the operation strength of the indoor air cleaner to 'high' when the indoor air condition of the vehicle is determined to be 'very bad'.

* * * * *